United States Patent Office 2,972,632
Patented Feb. 21, 1961

2,972,632

CONVERSION OF VERBENOL TO MONOCYCLIC AND ACYCLIC COMPOUNDS

Joseph P. Bain, Harry G. Hunt, Eugene Albert Klein, and Albert B. Booth, Jacksonville, Fla., assignors to The Glidden Company, Cleveland, Ohio, a corporation of Ohio No Drawing. Filed Apr. 14, 1953, Ser. No. 348,825

26 Claims. (Cl. 260—587)

The present invention is concerned with the treatment of verbenol to produce useful products and is particularly concerned with the pyrolysis of verbenol and certain novel products resulting therefrom.

The production of menthol has in the past been accomplished by the hydrogenation of thymol. This process produces racemic menthol and leaves much to be desired in the matter of costs. Optically-active menthol has also been made by the cyclization of citronellal followed by hydrogenation, but this process is dependent upon a variable supply of foreign raw material subject to such wide variations in price that the process is at times uneconomic to operate.

Pinene is a readily available material and, as is known, air oxidation thereof produces an appreciable yield of verbenol at comparatively low costs. The use of verbenol as a raw material for the production of menthol would therefore be highly desirable.

It is accordingly an object of the present invention to provide an improved process for producing menthol.

A further object is to provide a process for producing optically-active menthol.

Another object of the present invention is to provide a process for treating verbenol to produce intermediates useful in the manufacture of menthol as well as other useful products.

An additional object is to provide new compounds derivable from verbenol.

Still another object is to provide a new process for making valuable terpene compounds.

Other objects will be apparent to those skilled in the art.

In our study of the production of menthol, we have found that pyrolysis of verbenol leads to a mixture containing monocyclic and acyclic compounds. Fractionation of the pyrolysis mixture and identification of compounds in the various fractions has shown the mixture to be composed of the following compounds: verbenene, pseudocyclocitral, pseudotagetones, unreacted verbenol, cis- and trans-1,8-p-menthadiene-5-ol (limonene-5-ol), trans-1,8-p-menthadiene-3-ol (trans-isopiperitenol, limonene-3-ol), citral and small amounts of compounds from the interaction of the redox system produced on pyrolysis. Of particular interest in the production of menthol is the fact that the 1,8-p-menthadienols may be made to constitute the largest fraction of the mixture. Of even more interest for the production of optically active menthol is the fact that the 3-hydroxy compound is the predominating menthadienol and that when optically active verbenol is used, the p-menthadiene-3-ol is optically active, and upon conversion of the optically active menthadienol to menthol, the menthol is optically active.

Conversion of the menthadienols to menthols is accomplished by catalytic hydrogenation, suitably at pressures under 2,000 pounds per square inch.

Flow Sheet I shows the products resulting from pyrolysis and the conversion of the menthadienols to menthol. Flow Sheet I shows the products of the hydrogenation of the limonene alcohols to be menthols. These are menthol, neomenthol, isomenthol and neoisomenthol. These menthols can be separated by fractional distillation or by other known methods. Furthermore, as is known, any one of the menthols or a mixture of menthols can be equilibrated by heating with alkali, or by other known methods to provide a mixture rich in menthol. Thus, any menthol or mixture of menthols can be converted to menthol itself

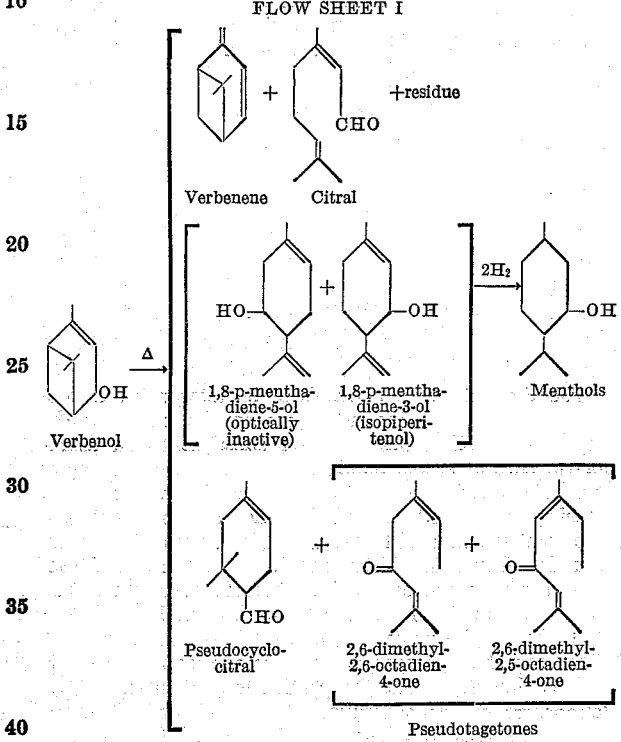

FLOW SHEET I by use of suitable known procedures. It may be pointed out here that in ordinary practice some menthone is also usually present.

The best known verbenol and resulting from air oxidation of pinene is termed trans-verbenol but cis-verbenol has also been described; Schulz and Doll, Berichte Schimmel, 1940, page 38; as resulting from reduction of verbenone and is therefore available from that source. However, the cis-verbenol described by Schulz and Doll could not have been pure in the light of our experience since we have produced pure, high melting, crystalline cis-verbenol from verbenone of opposite optical sign of rotation, whereas Schulz and Doll reported a product of the same optical sign as that of the verbenone from which is was produced. The details of our preparation are disclosed below and the infrared absorption bands for our pure cis-verbenol are reported in Table I of infrared data, accompanying Example II. While trans-verbenol is easily available, it will be appreciated that cis-verbenol is also a useful raw material for practice of this invention and mixtures of the cis- and trans-forms are also useful. Further data is shown in the examples below.

If the starting verbenol is optically active, an optically active menthadien-3-ol is produced, and if an optically active menthadiene-3-ol is used for hydrogenation, the mixture of methols produced from such optically active menthadien-3-ol will be predominately of the same family, so that upon equilibration of this mixture of menthols an optically active menthol is produced. As shown by Simonsen, The Terpenes, 2nd ed., vol. 1, p. 243, each family of menthols is such that the rotation of the menthol is opposite to that of the isomenthol, neomenthol and neoisomenthol. Thus, l-menthol, d-isomenthol, d-neomenthol and d-neoisomenthol constitute one family, and the menthols of the opposite rotation constitute the other family.

Flow Sheet II shows the conversion of trans-d-verbenol to l-menthol. It will be noted that the trans-configuration of the 3- and 4-positions is maintained throughout the pyrolysis and hydrogenation steps. However, since the d-isomenthol is configurationally related to l-menthol, l-menthol is formed upon equilibration. In the case of cis-d-verbenol, the cis configuration would result in the formation of d-neomenthol, which likewise yields l-menthol. Similarly, trans-l-verbenol leads to l-isomenthol and d-menthol, and cis-l-verbenol leads to l-neomenthol and d-menthol.

FLOW SHEET II

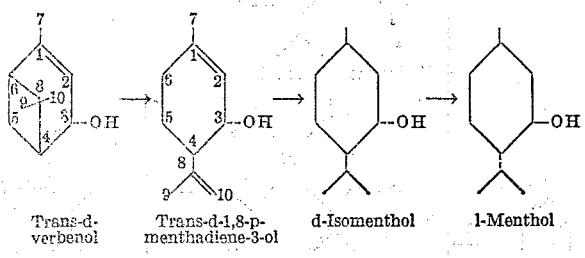

Trans-d-verbenol   Trans-d-1,8-p-menthadiene-3-ol   d-Isomenthol   l-Menthol

The Flow Sheet II above is to be interpreted as representing (1) the ring as planar in the plane of the paper; (2) solid lines for ring substituents on asymmetric carbon atoms indicate a plane above the paper; and (3) dotted lines represent a plane below the paper, it being understood that it is intended to show only relative configurations of the asymmetric centers of the compounds. Thus, in d-isomenthol, the methyl and isopropyl groups are cis- with respect to each other, and both are trans- with respect to the hydroxyl. In l-menthol, the alkyl groups are in the trans-position to each other and the hydroxyl is trans- to the isopropyl group.

It is thus seen that the particular configurational relationships of the substituents on the 3 and 4 carbon atoms are substantially maintained during the pyrolysis step. It is also seen that when the configurations at 3 and 4 are trans, the hydrogenation is such that the 1-methyl group is directed predominantly cis to the isopropyl group and that when the configurations of 3 and 4 are cis that the hydrogenation is predominantly such that the methyl group is trans to the isopropyl group. Having thus fixed the configuration of the methyl group, only menthols of the same family are produced on equilibration since the configuration at the 1-position is very stable and the equilibration conditions are not such as to cause epimerization at the 1-position.

It will be appreciated, of course, that small amounts of compounds of other configurations may be produced. Also, the starting material may not be optically pure. However, if optically active compounds are used, the configurations will be predominantly as indicated, and an optically active mixture of menthols will be produced from which optically active menthol can be recovered as well as racemic menthol, the relative amounts of each being dependent upon the optical purity of the precursor.

It will, of course, be understood that when starting with racemic materials, only racemic menthol can be produced by the present method without resorting to some resolution procedure.

The following examples are illustrative:

EXAMPLE I

Pyrolysis of verbenol

About 3 cc. of verbenol was placed in a glass capsule and the capsule was evacuated and sealed. The sealed capsule was placed in an oil bath at 237–242° C. and remained there for three hours, at which time it was removed, cooled and opened. There was a small amount of water in the material indicating a little dehydration of verbenol or of alcohols formed by its pyrolysis. It had a noticeably pleasant odor reminiscent of fresh leaves or lemon grass.

An infrared spectrogram of the heat treated material showed that little verbenol was still present, though other alcohols were present. Strong absorptions in the spectrogram at wave lengths associated with presence of conjugate carbonyl linkages indicated the presence of this type linkage in the product. There was also present an absorption band indicating the presence of the $CH_2=C<$ group which is not present in verbenol.

The ultraviolet spectrum of the product was somewhat less indicative of the nature of the products formed by heat treatment. Since, however, verbenol shows only weak absorptions and does not shown an absorption maximum above 220 m$\mu$ in the ultra-violet, whereas the heat treated product showed strong absorptions throughout the region 220 to 340 m$\mu$ and an absorption maximum at 233 m$\mu$, profound changes in the structure of verbenol were caused by heat treatment. The rather poorly defined absorption maximum at 233 m$\mu$ was clearly a resultant of absorption maxima of several components rather than representative of a single conjugated compound. The specific extinction coefficient $$(\alpha = E_{1\,cm.}^{g/l.})$$

for the absorption maximum at 233 m$\mu$ was 39, indicating the presence of one or more strongly absorbing conjugated systems.

EXAMPLE 2

Liquid phase pyrolysis of trans-d-verbenol

Five gallons of trans-verbenol of 90–95% purity and whose verbenol content possessed a rotation of about $[\alpha]_D^{25}$ +80° was pyrolyzed in a stainless steel stirred autoclave at 250° C. for 4 hours after first displacing the air in the autoclave with nitrogen. On cooling to room temperature, very little water, about one cc., separated, indicating little dehydration had taken place. The isomerizate was a clear golden liquid with characteristic odor somewhat reminiscent of lemon grass oil.

The product was fractionally distilled using an efficient column, first at 20 mm. absolute pressure, then when the boiling point rose to about 105° C., the absolute pressure was reduced to 15 mm. and the distillation continued to a pot temperature of 187° C. Thirty-five fractions were collected throughout the distillation and ranged in size from 50 to 425 grams. Infra-red spectrograms were made for each fraction and these indicated the number of major pyrolysis products as well as the composition and quantity of each of these major products. Ultraviolet spectrograms were made for fractions found to contain carbonyl materials. The following compounds in order of their increasing boiling points were found to be present:

(A) *Hydrocarbons including verbenene and its monocyclic isomers.*

(B) *Pseudocyclocitral (4,6,6-trimethyl-3-cyclohexene-1-carboxyaldehyde).*—This aldehyde appeared in fractions boiling from 92.0–93.5° C. at 20 mm. It was identified and characterized as follows:

(1) Oxidation of this product by means of silver oxide yielded the corresponding carboxylic acid of melting point 85° C., which when heated with selenium at 280° C. for 40 hours yielded 2,4-dimethyl benzoic acid of melting point 124°, which was identified by mixed melting point with an authentic sample and also by its infrared spectrum which was identical with that of a pure known sample of 2,4-dimethyl benzoic acid.

(2) The presence of an aldehyde group was established by conversion of pseudocyclocitral to the corresponding dimethyl acetal by means of methanol and hydrochloric acid. The acetal possessed a refractive index of 1.4615 at 26.5° C.

(3) Pseudocyclocitral forms a crystalline bisulfite adduct readily when shaken with concentrated sodium bisulfite solution.

(4) Pseudocyclocitral condenses readily with acetone in the presence of sodium hydroxide to yield the alkylidene acetone, boiling point 128° C. at 10 m.m., and possessing a pleasant, woody odor.

(5) Pseudocyclocitral was selectively reduced with hydrogen, using a platinum oxide catalyst, to the corresponding unsaturated primary alcohol. This alcohol, 4,6,6-trimethyl-3-cyclohexene-1-carbinol, was also found to be present in the higher boiling fractions of the verbenol pyrolysate in small amounts; apparently it was formed as a result of a redox reaction. The unsaturated primary alcohol was also reoxidized to pseudocyclocitral by means of chromic acid.

(6) Complete hydrogenation of pseudocyclocitral yielded the corresponding saturated primary alcohol, 2,2,4-trimethyl-cyclohexane-carbinol.

(7) The ultraviolet spectrum of pseudocyclocitral in iso-octane showed a single maximum absorption which occurred at 300 mμ, the specific extinction coefficient $$(\alpha = E_{1\,cm.}^{n})$$

was 0.2 at this point, thus proving that the double bond was not conjugated with the carbonyl group.

(8) The infrared spectrum indicated the absence of a $CH_2=C<$ grouping, but presence of a tri-substituted ethylene corresponding to the proposed structure.

(C) *2,6-dimethyl-2,6-octadiene-4-one* (α - *pseudotagetone*).—This aliphatic ketone was most concentrated in fractions of verbenol pyrolysate boiling at about 98° C. at 20 mm. pressure. It is characterized by a strong absorption at 234 mμ in the ultraviolet region of the spectrum, which indicates that one of the double bonds is conjugated with the carbonyl group. Infrared analysis showed the grouping $CH_2=C<$ was not present. On hydrogenation with a nickel catalyst at 125° C., it yielded the corresponding saturated ketone, 2,6-dimethyl-octane-4-one, having the properties $d_4^{15.5}$ 0.819, $n_D^{20}$ 1.4200, boiling point 71° C. at 0 mm., semicarbazone M.P. 91°. These data are in good agreement with the known and published physical constants for this saturated ketone as produced by hydrogenation of tagetone.

100 grams (about ⅔ of a mole) of a fraction rich in α-pseudotagetone but containing pseudocyclocitral was agitated with 160 grams of sodium bisulfite dissolved in 600 grams water containing brom thymol blue indicator. Alkali was set free as the reaction with the bisulfite proceeded and was neutralized by dropping in glacial acetic acid from a burette, but maintaining the mixture always on the alkaline side. It was observed that by allowing the nearly neutral water phase to stand, it again becomes strongly alkaline, thus indicating the cleavage of the original ketone bisulfite into smaller ketone molecules which reacted with the sulfite, releasing alkali. When 40 grams of acetic acid (⅔ mole) had been fed in, the reaction was stopped. Twenty-five grams of oil remained, which was mostly pseudocyclocitral. Thus, the above process permits the removal of α-pseudotagetone from pseudocyclocitral which does not so readily form a bisulfite compound under alkaline conditions.

Acidification of the aqueous layer with HCl yielded no oil. Making it strongly alkaline (cold) with KOH yielded a ketone, UV $\lambda_{max}$. 256 mμ, probably β-pseudotagetone or a stereoisomer thereof (the pseudotagetones are capable of cis-trans isomerism). After separation of the oil, the water layer was boiled under a fractionating column, collecting distillate to 85° C. Infrared examination of the distillate showed acetone and methyl ethyl ketone, no conjugated carbonyl compounds.

(D) *2,6-dimethyl-2,5-octadiene-4-one* (β - *pseudotagetone*).—This aliphatic was most concentrated in fractions of the verbenol pyrolysate boiling at approximately 102° C. at 20 mm. Infrared spectroanalysis showed the absence of the $CH_2=C<$ grouping. It was characterized by its strong ultraviolet absorption at 257 mμ (iso-octane) which showed that both double bonds were conjugated with the carbonyl group, and by its hydrogenation to 2,6-dimethyl-octane-4-one under similar conditions to those shown under "(C)" above for hydrogenation of 2,6-dimethyl-2,6-octadiene-4-one. Further confirmation of the presence and identity of this compound was obtained through its hydrolysis with boiling dilute sodium hydroxide whereupon there was formed a mixture of acetone and methyl ethyl ketone.

(E) *Verbenol*.—Unreacted verbenol was detected by infrared spectrophotometric methods in the fractions boiling at about 105° C. at 20 mm., and 100° C. at 15 mm. pressure. It was not isolated in pure form but contained substantial amounts of the verbenol pyrolysis products boiling nearby.

(F) *Fractions boiling from about 105° C. at 20 mm. to 106° C. at 15 mm.*—These fractions contained besides a little verbenol and other pyrolysis products a mixture of the cis- and trans-forms of limonene-5-ol (1,8-menthadiene-5-ol). These two forms of limonene-5-ol comprised 90% or more of some of the fractions boiling within this range. The characterization of the fractions as consisting principally of cis- and trans-forms of limonene-5-ol was accomplished through application of a combination of spectroscopic and chemical methods. The presence of the $CH_2=C<$ grouping within the isopropenyl group of the limonene-5-ol was shown by infrared methods wherein the known absorptions characteristic of this group could be definitely recognized in the spectrum of the crude fractions. Furthermore, the optical density of these absorptions corresponded to those to be expected for an alcohol or alcohols containing the limonene skeleton as determined by measurement and comparison of the optical density of such absorptions in limonene itself. Further, spectra of certain consecutive fractions boiling within the specific limits showed $CH_2=C<$ and secondary hydroxyl absorptions in the infrared region of approximately constant magnitude, yet it was evident from the change in position and density of other absorption bands characteristic of other groupings within the molecule that two compounds were involved. These compounds were hydrogenated selectively to dihydro-compounds, the cis- and trans-forms of carvomenthene-5-ol (1-p-menthene-5-ol), which differ from the piperitols in their greater stability and in that they are not converted to piperitone on mild oxidation with chromic acid but form a new non-conjugated ketone. The ketone so produced is, however, the same, whether produced from the cis- or the trans-carvomenthene-5-ol and furthermore this ketone is not a conjugated ketone as shown by its ultraviolet spectrum. However, it is readily converted to piperitone by dissolving it in sulfuric acid and then recovering it. These and other facts presented in this disclosure prove that the two alcohols concentrated in this fraction of verbenol pyrolysis products are indeed the cis- and trans-forms of limonene-5-ol. The separation of cis- and trans-forms was not complete in this fractionation, but fractions chosen from redistillation of these fractions richest in each form were chosen for hydrogenation and other studies so that the individual behavior of each form could be assayed.

(1) Trans-limonene-5-ol (trans-1,8-p-menthadiene-5-ol), boiling point about 94° C. at 10 mm., was hydrogenated at 125° C. and a maximum of 750 lbs./sq. in. hydrogen pressure over nickel catalyst until the product was almost entirely saturated as shown by titration with bromine. The reduction product crystallized partly on cooling and was shown by infrared spectroscopic methods to consist chiefly of isomenthol.

(2) Cis-limonene-5-ol (cis-1,8-p-menthadiene - 5-ol), boiling at about 96° C. at 10 mm., was not isolated in high purity but a fraction rich in this material, but still over 50% trans-1,8-p-menthadiene-5-ol, was hydrogenated over nickel catalyst at 125° C. and under 600 lbs./sq. in. pressure, maximum, until it was saturated. The reduction pro by infrared assay to contain about 41% neomenthol and 49% isomenthol, arising from the cis- and trans-limonene-5-ol, respectively, originally in the fraction prior to hydrogenation.

(3) A sample of trans-limone-5-ol of boiling point 94° C. at 10 mm. pressure was diluted with an equal volume of light petroleum and reduced with hydrogen at 50 lbs./sq. in. pressure, maximum. Platinum oxide was used as catalyst. The absorption of hydrogen ceased in about seventy-five minutes and with absorption of one mole of hydrogen per mole of alcohol. An infrared spectrogram of the product showed that the $CH_2=C<$ double bond had been completely hydrogenated and that a new unsaturated alcohol had been produced which was not identical with either cis- or trans piperitol as determined by comparison of its infrared spectrum with that of the spectra of known samples of the two piperitols.

Twenty-five grams of the reduction product, trans-carvomenthene-5-ol (trans-1-p-menthene-5-ol) was diluted with 25 cc. of light petroleum and mixed with 70 grams water and 18 grams sodium dichromate. Twenty-six grams of concentrated sulfuric acid was diluted with an equal weight of water and this solution was fed slowly into the stirring alcohol-dichromate mixture with cooling and at such a rate that the temperature did not exceed 40° C. The black, gummy solid which first formed slowly dissolved on continued stirring for one hour. The oil layer was separated, washed and the solvent removed from it by distillation. The crude ketone, carvo-menthene-5-one (1-p-menthene-5-one) was shown by ultraviolet and infrared studies to be a non-conjugated ketone. When it was dissolved in concentrated sulfuric acid and recovered by pouring this mixture into water, the conjugated ketone, piperitone, resulted as determined by comparison of the infrared spectrum of the reaction product with that of a known sample.

(4) A sample of cis-limonene-5-ol, boiling slightly higher than the sample of trans-limonene-5-ol used in the reduction described in section (3) above and containing a little trans-limonene-5-ol and a little trans-isopiperitenol, was selectively hydrogenated with platinum oxide by the same procedure as used for selective reduction of trans-limonene-5-ol as outlined in section (3) above. There was formed cis-carvomenthene-5-ol (cis-1-p-menthene-5-ol) contaminated by a little trans-carvomenthene-5-ol and tran-piperitol. Oxidation of the product with chromic acid yielded 1-p-menthene-5-one identical with that produced in section (3) above, together with a trace of piperitone. The non-conjugated ketone was isomerized as in section (3) above to piperitone.

(G) *Fractions of the verbenol pyrolysis mixture boiling in the range 106–110° C. at 15 mm.*—These fractions were nearly pure trans-isopiperitenol (trans-1,8-p-menthene-3-ol). The purest fractions showed an optical rotation of +30.4° for a 10 cm. tube reading taken at 25° C., thus showing that optically active isopiperitenol results from the pyrolysis of optically active verbenol. The identification of the pyrolysis product of vebenol boiling at 106–110° C. at 15 mm. as trans-isopiperitenol was established by the following tests and procedures:

(1) The infrared spectrum showed the presence of the secondary hydroxyl group and the $CH_2=C<$ grouping.

(2) Selective hydrogenation of 152 grams of a fraction boiling at 107° C. at 15 mm. and dissolved in 50 grams light petroleum with hydrogen at low pressure (10 to 40 lbs./sq. in.) and in the presence of 0.5 gram platinum oxide resulted in absorption of one molar equivalent of hydrogen. After filtration to remove catalyst and removal of the petroleum by distillation, an infrared spectrum of the product showed it to no longer contain the $CH_2=C<$ grouping and to consist almost exclusively of tran-piperitol as determined by comparison with the spectrum of a known sample of trans-piperitol. It was evident from the infrared spectrum that there was present as an impurity a few percent of cis-piperitol possibly resulting from traces of cis-verbenol in the material taken for pyrolysis or possibly resulting from the interaction of the redox system of aldehydes, ketones and alcohols produced on pyrolysis of the verbenol.

(3) Oxidation of a fraction rich in trans-isopiperitenol with a mixture of sodium dichromate and sulfuric acid at below 40° C. yielded isopiperitenone which was identified by comparison of its ultraviolet and infrared absorption spectra with that of a known sample.

(4) Fraction of partly purified isopiperitenol were combined to form a product possessing an optical rotation of +20.0° as measured in a 10 cm. tube at 25° C. Seventeen hundred eighty-three grams of this combined material was hydrogenated at about 125° C. and 600 pounds/sq. in. hydrogen pressure using 18 grams of nickel catalyst. The product was tested for bromine value and showed the presence of less than 1% of a double bond equivalent of unsaturation remaining. Infrared analysis showed the product to consist of about 74% isomenthol. The crude product, which showed a specific rotation of about +7.6° in methanol solution, solidified partly at room temperature, and on centrifuging yielded 28% of its weight of isomenthol showing $[\alpha]_D^{25}$ +22.25° (the rotation of optically pure isomenthol is +27°). Additional partly optically active isomenthol was obtained by cooling the mother liquor below room temperature and centrifuging the party crystallized liquor.

Recrystallization of the isomenthol of optical rotation +22.25° from a like weight of light petroleum gave optically pure d-isomenthol in 75% yield.

It is known that any one of the menthols or mixtures thereof may be converted to an equilibrium mixture containing menthol, isomenthol, neomenthol and neoisomenthol by any of several procedures. Equilibration of the di-isomenthol produced by the above process from verbenol was accomplished by heating it in the presence of hydrogen and a hydrogenation catalyst. The equilibration mixture was fractionated to produce a crude menthol cut which upon recrystallization yielded l-menthol which was nearly optically pure.

The liquors remaining after the crystallization of the d-isomenthol were fractionated to separate and to identify the components of the liquid portions of the hydrogenation product of the party purified isopiperitenol. The results of this analysis showed that the whole hydrogenation product, prior to removal of the d-isomethol, consisted of:

| | Percent |
|---|---|
| Hydrocarbons | 1.7 |
| Neomenthol | 14.1 |
| Menthol | 2.2 |
| Isomenthol | [1] 73.2 |
| Primary alcohols | [2] 5.0 |
| Distillation residue, loss and unaccounted for | 3.8 |
| | 100.0 |

[1] Total racemic and d-isomenthol.
[2] Largely 2,6-dimethyl-octanol.

(H) *Citral.*—This aldehyde was identified by odor in the isopiperitenol fractions boiling in the range 106–110° C. at 15 mm. pressure. Its presence was further confirmed by the isolation of 2,6-dimethyl-octanol from distillation fractions of the product produced by the hydrogenation of crude isopiperitenol fractions. The 2,6-dimethyl-octanol was identical with a sample of the commercial material produced by hydrogenation of geraniol.

(I) *Fractions boiling above 110° C. at 15 mm.*—These fractions contained, aside from small amounts of isopiperitenol, compounds resulting from interaction of the redox system of compounds produced on verbenol pyrolysis. Among such compounds produced by redox reaction were the primary alcohol corresponding to pseudocyclocitral, and ketones, isopiperitenone and piperitenone.

Analytical data on the whole pyrolysis mixture and the fractions resulting from distillation showed that the verbenol pyrolysis product possessed the following approximate composition:

| | Percent |
|---|---|
| Hydrocarbons | 2.0 |
| Pseudocyclocitral | 16.5 |
| Pseudotagetones | 12.7 |
| Unreacted verbenol | 4.3 |
| Limonene alcohols | [1] 32.0 |
| Redox compounds | 6.7 |
| Higher boiling compounds as distillation residue | 18.5 |
| Minor volatile compounds not identified | 5.3 |
| Loss on distillation | 4.0 |

[1] Includes the cis- and trans-forms of limonene-5-ol and limonene-8-ol (isopiperitenol).

In Table I are given characteristic infrared absorption bands for verbenol and the principal pyrolysis products. The infrared absorption bands for the pseudotagetones are not given since they are difficult to characterize accurately, and the ultraviolet absorption and other data given are sufficient to identify them.

TABLE I.—CHARACTERISTIC ABSORPTION BANDS IN THE INFRARED REGION FOR VERBENOL AND ITS PYROLYSIS PRODUCTS. WAVELENGTHS REPORTED IN MICRONS

Cis-verbenol—6.06, 7.24, 7.29, 7.33, 7.51, 7.65, 8.01, 8.23, 8.50, 8.88, 8.98 9.15, 9.30, 9.66, 10.0, 10.40, 10.64, 11.01, 11.17, 11.44, 12.32, 12.87, 14.31.

Trans-verbenol—3.0 (hydroxyl), 9.30, 9.75, 10.03, 10.35, 10.61, 10.72, 10.82, 11.15, 11.80, 12.18, 13.0, 13.83.

Pseudocyclocitral—5.77 (carbonyl), 8.70, 9.05, 9.28, 9.82, 10.10, 10.60, 11.0, 11.91, 12.68, 13.83.

Tetrahydrotagetone—5.83 (carbonyl), 6.81, 7.10, 7.31, 7.75, 8.25, 8.55, 8.73, 9.05, 10.43, 10.85, 12.05, 12.92, 14.85.

Trans-limonene-5-ol—2.95 (hydroxyl), 3.43, 6.06 (CH$_2$=C<), 6.95, 7.26, 7.52, 7.78, 7.95, 8.69, 9.0, 9.30, 9.70, 10.50, 10.79, 11.27, 11.52, 12.62, 13.0.

Cis-limonene-5-ol—2.95 (hydroxyl), 6.06 (CH$_2$=C<), 8.69, 10.18, 12.45 (most characteristic and easily distinguishable). (Absence of band at 13.0 microns distinguishes that from trans-form.)

Trans-isopiperitenol—2.95 (hydroxyl), 6.06 (CH$_2$=C<), 6.95, 7.26, 8.68, 9.74, 10.00, 10.36, 11.27, 12.60, 12.85.

EXAMPLE 3

*Liquid phase pyrolysis of trans-l-verbenol*

Pure trans-verbenol (500 grams) of rotation $[\alpha]_D^{25}$ —155° (about 92% optically active) was pyrolyzed in a stainless steel autoclave at 225–255° for 2⅓ hours. An infrared spectrogram of the reaction mixture showed it to consist of the same compounds as those identified from the pyrolysis mixture described in Example 2. That example shows the presence of 4,6,6-trimethyl-3-cyclohexene-1-carboxaldehyde; 2,6-dimethyl-2,6-octadiene-4-one; 2,6-dimethyl-2,5-octadiene-4-one; isopiperitenol; citral; limonene-5-ol and unreacted verbenol in the pyrolysis mixture. The pyrolysate was then reduced at 85–130° C. and 240–1700 lbs./sq. in. pressure in the presence of 10 grams nickel catalyst. The product still showed a little unsaturation at the end of the hydrogenation.

The reduction mixture was fractionally distilled using an efficient column, first at 10 mm. absolute pressure, then when the boiling point rose to 102°, the absolute pressure was reduced to 0.5 mm., and the distillation continued to a pot temperature of 210°. Thirty fractions were collected throughout the distillation and ranged in size from 2 to 31.5 grams. Infrared spectrograms were made for many of the fractions, and these indicated the number of major reduction products as well as the composition and quantity of each of these major products. The following compounds in order of their increasing boiling points were found to be present:

(A) Hydrocarbons.

(B) Tetrahydrotagetone (2,6-dimethyl-octane-4-one) appeared in fractions boiling from 68–75° at 10 mm. It was identified from its infrared spectrum by comparison with that of an authentic sample.

(C) Neomenthol and menthol were the major constituents of fractions boiling from 89–96° at 10 mm. They were identified from their infrared spectra by comparison with the spectra of the known compounds.

(D) Isomenthol was the primary product in the fractions boiling from 96–100.5° at 10 mm. Menthol, neomenthol and verbanol were also present. The isomenthol crystallized and was removed by filtration. The impure product was recrystallized twice from hexane to yield an isomenthol, $[\alpha]_D^{25}$ —23.8° (c.=4 g. made to 100 cc. with ethanol), M.P. 82–82.5°. The products in the fraction and the purified isomenthol were identified from their infrared spectra.

(E) Verbanol was the major component in fractions boiling at about 102° at 10 mm. Comparison with a standard infrared spectrum of verbanol provided the proof of the presence of this compound in fractions boiling in this range. The verbanol-containing fractions also contained other material which appeared to be chiefly 2,6-dimethyloctanol.

(F) 4,6,6-trimethyl-3-cyclohexene-1-methanol was the major constituent of fractions boiling from 58.5–69° at 0.5 mm., and which were the only fractions from the hydrogenation which showed substantial unsaturation to bromine. Its presence was shown by comparsion of the infrared spectra of these fractions with that of an authentic sample.

Distillation data and the spectra of the various fractions when interpreted quantitatively showed that the reduction mixture possessed the following approximate composition:

| | Percent |
|---|---|
| Hydrocarbons | 6.0 |
| Tetrahydrotagetone | 7.0 |
| Menthols (isomenthol, neomenthol and menthol) | 25.0 |
| Verbanol | 25.0 |
| 4,6,6-trimethyl-3-cyclohexene-1-methanol | 13.0 |
| Minor volatile compounds not identified | 3.0 |
| Distillation residue | 17.0 |
| Loss on distillation | 5.0 |
| | 100.0 |

EXAMPLE 4

*Vapor phase pyrolysis of trans-l-verbenol*

Pure trans-verbenol, 467 grams, about 91% of the optically active l-form, was pyrolyzed in the vapor phase by introducing the liquid dropwise at 2 cc./min. down the side of a vertical ¼″ standard iron pipe maintained at 400° C. The temperature was determined from a thermocouple inserted down the center of the pipe.

The pyrolysate, which had the characteristic odor of citral, was shown through its infrared spectrum to contain approximately 15% total alcohols and considerable carbonyl material. The reaction mixture was fractionated under conditions similar to the example shown in Example 2, and fractions of the distillate were analyzed by infrared and ultraviolet spectrophotometric procedures. The spectra showed the presence of the carbonyl compounds: citral, pseudotagetones and pseudocyclocitral; and the alcohols: isopiperitenol and limonene-5-ol. These compounds were present in fractions boiling in the ranges specified in the example shown in Example 2 as the boiling range for the compound involved.

Distillation data and the spectra of the various fractions when interpreted quantitatively showed that the pyrolysis mixture possessed the following approximate composition:

| | Percent |
|---|---|
| Pseudocyclocitral | 40.0 |
| Pseudotagetones | 20.0 |
| Isopiperitenol and limonene-5-ol | 12.5 |
| Citral | 9.0 |
| Minor volatile compounds not identified | 4.0 |
| Higher boiling compounds as distillation residue | 7.5 |
| Loss on pyrolysis and distillation | 7.0 |
| Total | 100.0 |

The pseudocyclocitral from this experiment showed $\alpha_D^{25}$ —65° (10 cm. tube).

Fifty grams of the material boiling from 98.5–101.0° C. at 10 mm. was gradually fed into a mixture of 50 grams acetone, 100 grams water and 2.5 grams sodium hydroxide, stirring at room temperature. The mixture was stirred 24 hours and then brought to neutrality by dropwise addition of sulfuric acid. The acetone was distilled off to a pot temperature of 100° C. and the residue poured into water. 52 grams of oil was recovered.

This oil was distilled at 10 mm., and after removal of isopiperitenol, the best fraction, $B_{\cdot 10}$ 145° C., $n_D^{25}$ 1.5265, UV $\lambda_{max}$. 281 m$\mu$ (in iso-octane), $\alpha = 128°$, had the characteristic odor of pseudo-ionone. The above physical constants agree well with those reported for pseudo-ionone.

Twenty grams of the pseudo-ionone fraction from this distillation was diluted with 20 grams benzene and fed dropwise into 60 grams of 85% phosphoric acid, allowing the temperature to reach 45° C. The mixture was stirred for ½ hour at this temperature, then poured into ice water. The separated oil, after removal of the benzene by heating under vacuum, had the intense violet odor of $\alpha$-ionone. Comparison of the infrared spectrogram of this product with that of an authentic specimen of $\alpha$-ionone further confirmed the identity of the product as $\alpha$-ionone, thereby also confirming the formation of citral by pyrolysis of verbenol.

EXAMPLE 5

Removal of carbonyls from pyrolysis of trans-verbenol. Hydrogenation of alcohol fraction 10 cc. of pyrolyzed trans-verbenol assaying 40% carbonyl as $C_{10}H_{16}O$ was mixed with 10 grams hydroxylamine hydrochloride and 3 grams sodium hydroxide dissolved in 100 cc. of methanol and allowed to stand one hour at room temperature with occasional shaking. It was then diluted to 500 cc. with water and the oil layer picked up in hexane. The mixture of alcohols and oximes in hexane was then extracted with 10% sodium hydroxide solution until no more oximes were being extracted, as shown by acidification of the caustic extract. After removal of the hexane under vacuum, 5.5 cc. of oil was recovered. Infrared examinaton showed that the carbonyl was almost completely absent and that the alcohol absorptions were intensified as would be anticipated. The presence of isopiperitenol as the chief alcohol was evident.

5.3 cc. of the oil was diluted with hexane to 100 cc. and hydrogenated at low pressure with ½ gram platinum oxide catalyst. After filtering off the catalyst and removal of the hexane under vacuum, the reduction mixture was examined by infrared and found to contain isomenthol, verbenol, and other alcohols.

EXAMPLE 6

Preparation of cis-verbenol

To 500 grams isopropyl alcohol in a 5-liter flask topped with an efficient fractionating column were added 100 grams aluminum isopropylate and 500 grams 1-verbenone. Acetone was fractionated off the top of the column until 190 cc. of distillate was recovered—mostly acetone but with some isopropanol.

The isopropanol was then distilled off to a pot temperature of 120° C. under 25″ vacuum. After cooling to room temperature, water was added carefully to precipitate the aluminum hydroxide, and a little $Na_2CO_3$ added to insure alkalinity. The aluminum hydroxide was then centrifuged off, washed well with benzene and discarded. The benzene and filtrate were combined and were heated and the solvent removed under vacuum. Infrared assay of the reduction product showed that it still contained 13% verbenone. This was removed by oximation, followed by removal of the oxime by extraction with sodium hydroxide.

The mixture of verbenols was then fractionated at 10 mm. 41 grams of fractions richest in cis-verbenol ($B_{\cdot 10}$ 90.5–91°) which boiled between the lighter by-product, verbenyl isopropyl ether, and trans-verbenol were cooled in the ice box whereupon they crystallized. Nearly pure cis-verbenol was recovered from these fracitons by centrifuging. Twenty grams of this cis-verbenol was recrystallized once from light naphtha and gave practically pure cis-verbenol, M.P. 72° C. (air-dried), $[\alpha]$ +11.5° (one gram to 10 cc. methanol). Infrared examinaton showed that the product contained not more than traces of trans-verbenol.

Beckmann oxidation of a few grams of cis-verbenol converted it to verbenone, thus completing its identification.

It is to be noted that the literature reports that cis-verbenol has a melting point of 15.5° C. and the same sign as the starting verbenone, $\alpha_D$ +65° for d-verbenone, Schulz and Doll; Ber. Schimmel, 1940, 43. In view of our work, it would appear that Schulz and Doll isolated some other compound or at least a very impure mixture, probably containing trans-verbenol.

The infrared spectrum of cis-verbenol is shown in Table I.

EXAMPLE 7

Pyrolysis of cis-verbenol

Cis-verbenol, 235 grams, $\alpha_D^{25}$ —4.1° (10 cm. tube) was pyrolyzed in a stainless steel autoclave from which the air had been displaced with hydrogen. The temperature in the autoclave was maintained at 250° C. for four hours. The bomb was allowed to cool slowly to room temperature. The product which was removed contained a small amount of water and had a citral odor. An infrared spectrum on the total product showed about 25–30% total alcohols, the presence of carbonyl material, and a compound containing a methylene group.

The product was fractionally distilled using an efficient Pyrex column filled with stainless steel protruded packing. The distillation was conducted at 10 mm., absolute pressure, to a pot temperature of 150° C., and then at 1 mm. to a pot temperature of 215° C. Nine fractions were collected and these ranged in size from 10 to 15 grams and in boiling point from 48° C., at 10 mm. to 73.5° C., at 1 mm. Infrared spectra were run on most of the fractions. The following materials in order of their increasing boiling points were found to be present:

(A) A fraction boiling at 49–56.6° C., at 1 mm., contained alcohol and carbonyl compounds. The fraction was oximated to remove carbonyl material and purify the alcohol present. In this reaction, 15 grams of the oil was added to a solution of 22.5 grams of hydroxylamine hydrochloride in 160 cc. of methanol containing seven grams of sodium hydroxide. The solution was allowed to stand at 25–50° for two hours. It was then poured into 600 cc. of water. The oil layer was taken up in light naphtha and separated from the aqueous phase which was then extracted with fresh light naphtha. The combined organic extract was then washed with 10% sodium hydroxide solution and then with saturated sodium bicarbonate solution. The solvent was then removed and the oily residue fractionated to yield an unsaturated alcohol, B.P. 50–60° C./ca. 1.5 mm., which contained only a trace of carbonyl compound. This alcohol was reduced with hydrogen in the presence of platinum oxide to produce a saturated alcohol which, by Beckmann oxidation, yielded menthone. The latter was identified from its infrared spectrum by comparison with the spectrum of a known sample of menthone. The oxidation product had the characteristic minty odor of menthone.

(B) Fractions boiling at 60–66.5° C., at 1 mm., contained trans-limonene-5-ol and citral as shown by comparison of the spectra of the fractions with the spectra of pure standard samples. These fractions had the characteristic strong lemon-like odor of citral. The presence of citral was also definitely confirmed by the formation of pseudoionone from these fractions in the presence of alkali by condensing them with acetone using known procedures for synthesis of pseudoionone from citral. The resulting pseudoionone was identified by spectrophotometric methods.

It will be understood that the foregoing examples are merely illustrative and that many variations may be made therein without departing from the invention.

Thus, the pyrolysis can be carried out over a wide range of temperatures, preferably between about 170° to 500° C., but temperatures as high as 750° C. can be employed. Similarly, the hydrogenation can be carried out under varying conditions of temperature and pressure and with various hydrogenation catalysts, as is well known to those skilled in the art. Also, instead of hydrogenating the entire pyrolysis mixture or the separate fractions of the limonene alcohols, the pyrolysis mixture can be fractionated to recover a fraction containing the mixture of limonene alcohols and this fraction then hydrogenated. Thus, any fraction from the pyrolysis of an optically active trans-verbenol containing the limonene-3-ol can be hydrogenated, the hydrogenation mixture then fractionally crystallized to crystallize out active material, and the precipitate and mother liquors separately equilibrated to yield optically active and optically inactive materials.

In the examples, various chemical means have been shown for the purification of certain fractions. Obviously these and similar expedients can be used to effect a separation of the initial pyrolysis mixture or the hydrogenated pyrolysis mixture. Thus, either the pyrolysis mixture or hydrogenation mixture, or portions of either, can be treated with reagents for the carbonyl group, such as semicarbazide, phenylhydrazine, hydroxylamine, Girard's reagent, glycols, etc., and the resulting addition products separated from the alcohol moieties of the mixture. Similarly, aldehydes can be removed by treatment with agents for aldehydes, such as sodium bisulfite, acetone, etc. In an analogous manner, reagents acting on the hydroxy group of the alcohols, such as boric acid, can be used to treat mixtures containing the alcohols and then separating the alcohol moieties from the non-alcoholic materials. Other specific means for separating and purifying the various products of the pyrolysis and/or hydrogenation can be employed within the skill of the art without departing from the broad scope of the invention.

The carbonylic compounds formed by the pyrolysis are useful solvents either as the unsaturated compounds or after saturation of the double bonds. They may also be converted to both the corresponding saturated and unsaturated alcohols, which likewise are useful as solvents. Also since the aliphatic ketones contain an $\alpha,\beta$-unsaturated ketone structure, they are useful as dienophiles. The citral is, of course, useful in the preparation of the ionones and for other well known purposes, and the pseudocyclocitral can be condensed with acetone to form the pleasant smelling alkylidene acetone which can be used as an odor chemical. The pseudocyclocitral can be used to prepare a series of compounds closely related to those based on cyclocitral which have known pharmacological and other uses.

In the foregoing description, all temperatures referred to are in degrees centigrade. The extinction coefficient of all compounds showing an absorption maximum in the ultraviolet region is the specific extinction coefficient, $$\alpha = E_{1\ cm.}^{1\%}$$

Also, we have herein assigned the cis- and trans-configurations to various compounds on the basis of the Auwers-Skita rule.

Having described the invention, what is claimed is:

1. The process of producing monocyclic and aliphatic oxygenated terpenes of the empirical formula $C_{10}H_{16}O$ which comprises thermally isomerizing verbenol by heating the same at a temperature in the range of 170° C. to 750° C.

2. The process of claim 1 in which the verbenol is trans-verbenol.

3. The process of claim 1 in which the verbenol is cis-verbenol.

4. The process of claim 1 in which the verbenol is optically active.

5. The process of producing monocyclic and aliphatic oxygenated terpenes of the empirical formula $C_{10}H_{16}O$ which comprises thermally isomerizing verbenol by heating the same at a temperature in the range of 170° C. to 750° C. and fractionally distilling the isomerization mixture to recover fractions enriched in 4,6,6-trimethyl-3-cyclohexene-1-carboxaldehyde; 2,6-dimethyl-2,6-octadiene-4-one; 2,6-dimethyl-2,5-octadiene-4-one; 1,8-p-menthadiene-5-ol; 1,8-p-menthadiene-3-ol; and citral, respectively.

6. The process of claim 5 in which the verbenol is optically active whereby an optically active 1,8-p-menthadiene-3-ol is produced having the same sign as the starting verbenol.

7. The process of producing 1,8-p-menthadiene-3-ol which comprises thermally isomerizing trans-verbenol by heating the same at a temperature in the range of 170° C. to 750° C. and fractionally distilling the isomerization mixture to recover therefrom fractions enriched in 1,8-p-menthadiene-3-ol.

8. The process of producing optically active 1,8-p-menthadiene-3-ol which comprises thermally isomerizing optically active trans-verbenol by heating the same at a temperature in the range of 170° C. to 750° C. and fractionally distilling the isomerization mixture to recover therefrom fractions rich in optically active 1,8-p-menthadiene-3-ol.

9. The process which comprises thermally isomerizing verbenol by heating the same at a temperature in the range of 170° C. to 750° C. whereby there is produced a mixture comprising monocyclic and acyclic oxygenated terpenes comprising an alcoholic component and a carbonyl containing component and separately recovering the alcoholic moiety and the carbonyl containing component.

10. The process which comprises thermally isomerizing verbenol by heating the same at a temperature in the range of 170° C. to 750° C. whereby there is produced a mixture comprising monocyclic and acyclic oxygenated terpenes comprising an alcohol component and a carbonyl component composed of a plurality of carbonyl containing materials, and producing a fraction enriched in alcohol from said isomerization mixture by a process involving (1) treatment of a mixture comprising alcoholic material and at least one carbonyl containing material with a reagent for the carbonyl group of said latter carbonyl containing material, and (2) separating said mixture into a fraction enriched in alcoholic material and a fraction enriched in the reaction product of the carbonyl containing material and the carbonyl reagent.

11. The process which comprises thermally isomerizing verbenol by heating the same at a temperature in the range of 170° C. to 750° C., and recovering from the isomerization mixture a fraction enriched in a monohydric limonene alcohol.

12. In a process for producing a menthol, the steps comprising thermally isomerizing verbenol by heating the same at a temperature in the range of 170° C. to 750° C., and hydrogenating the double bonds of at least one monohydric limonene alcohol produced by the isomerization.

13. The process of claim 12 in which the whole isomerization mixture is hydrogenated.

14. In a process for producing a menthol, the steps comprising thermally isomerizing trans-verbenol by heating the same at a temperature in the range of 170° C. to 750° C., and hydrogenating the double bonds of the 1,8-p-menthadiene-3-ol produced by the isomerization.

15. The process of claim 14 in which the verbenol is optically active.

16. The process of claim 15 in which the isomerization mixture is fractionated prior to the hydrogenation and the hydrogenation is carried out on a fraction which is enriched in 1,8-p-menthadiene-3-ol.

17. The process of claim 16 in which the hydrogenation mixture is fractionally crystallized to separate out an optically active menthol.

18. The process for producing 1-menthol which comprises thermally isomerizing dextro rotatory trans-verbenol by heating the same at a temperature in the range of 170° C. to 750° C., subjecting the isomerization mixture to a fractionation and a hydrogenation to saturate the double bonds in the 1,8-p-menthadiene-3-ol produced by the isomerization, in either order, to obtain a mixture of menthols, subjecting the mixture of menthols to fractional crystallization to crystallize d-isomenthol from the mixture and equilibrating the d-isomenthol to produce 1-menthol.

19. In a process for producing optically active and optically inactive menthols, the steps comprising thermally isomerizing optically active trans-verbenol by heating the same at a temperature in the range of 170° C. to 750° C., hydrogenating the limonene alcohols produced by the isomerization to saturate the double bonds thereof, recovering a mixture consisting essentially of optically active but optically impure menthols from the hydrogenation mixture, fractionally crystallizing the mixture of menthols to produce a crystalline portion of optically active material and a liquid portion of optically inactive material and equilibrating each portion to produce optically active menthol from the crystalline portion and racemic menthol from the liquid portion.

20. In a process for producing optically active menthol, the step comprising hydrogenating the double bonds of optically active 1,8-p-menthadiene-3-ol.

21. The process of claim 20 in which the 1,8-p-menthadiene-3-ol is dextro rotatory.

22. The process of claim 20 in which the 1,8-p-menthadiene-3-ol is d-trans 1,8-p-menthadiene-3-ol.

23. The process which comprises thermally isomerizing verbenol by heating the same at a temperature in the range of 170° C. to 750° C. and separating carbonyl containing material produced by the isomerization from other pyrolysis products by a process involving reaction of said carbonyl containing material with a reagent specific for the carbonyl group thereof and separating the reaction product from other isomerization products.

24. The process which comprises thermally isomerizing verbenol by heating the same at a temperature in the range of 170° C. to 750° C. whereby there is produced an isomerization mixture comprising monocyclic and acyclic oxygenated terpenes including citral, treating a citral containing fraction obtained from said isomerization mixture with acetone and recovering pseudoionone formed by the reaction between the citral and acetone.

25. The process of producing monocyclic and aliphatic oxygenated terpenes of the empirical formula $C_{10}H_{16}O$ which comprises thermally isomerizing verbenol by heating the same at a temperature in the range of 170° C. to 500° C.

26. The process of producing monocyclic and aliphatic oxygenated terpenes of the empirical formula $C_{10}H_{16}O$ which comprises thermally isomerizing verbenol by heating the same at a temperature in the range of 225° C. to 400° C.

References Cited in the file of this patent

UNITED STATES PATENTS

| | | |
|---|---|---|
| 2,428,352 | Bain et al. | Oct. 7, 1947 |
| 2,453,110 | Bain et al. | Nov. 9, 1948 |

OTHER REFERENCES

Blumann et al.: Berichte d.d.c. Ges., vol. 46 (1913), pp. 1194–8.

Fromm et al.: Ibid., vol. 401 (1913), pp. 253–62.

Fromm et al.: Ibid., vol. 425 (1921), pp. 208–16.

Blumann et al.: Annalen, vol. 478 (1930), pp. 303–6.

Schimmel et al.: Schimmel & Co. Report (1932), pp. 80–1.

Zeitschel et al.: J. Prakt. Chem., vol. 133, pages 370–3 (1932).

Chem. Abstracts, vol. 42, 7734C (1948).

Simonsen: The Terpenes, vol. II (1949), Cambridge at the Univ. Press; pp. 214–20.

Feiser et al.: "Org. Chem.," 2nd ed., 1950, published by Reinhold Publ. Co., 330 W. 42nd St., N.Y., pp. 213–214.

Simonsen (of record), vol. I, pages 102, 105, 297.

UNITED STATES PATENT OFFICE

CERTIFICATION OF CORRECTION

Patent No. 2,972,632

February 21, 1961

Joseph P. Bain et al.

It is hereby certified that error appears in the above numbered patent requiring correction and that the said Letters Patent should read as corrected below.

Column 7, line 5, after "pro" insert -- -duct showed no tendency to crystallize and was shown --.

Signed and sealed this 27th day of June 1961.

(SEAL)
Attest:

ERNEST W. SWIDER
Attesting Officer

DAVID L. LADD
Commissioner of Patents